(12) United States Patent
Narula et al.

(10) Patent No.: US 12,284,600 B2
(45) Date of Patent: Apr. 22, 2025

(54) SYSTEM AND METHOD FOR BLUETOOTH GROUP PAIRING AND CONNECTIVITY

(71) Applicant: Dell Products, L.P., Round Rock, TX (US)

(72) Inventors: Harpreet Narula, Austin, TX (US); Kameel Vohra, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 350 days.

(21) Appl. No.: 17/813,941

(22) Filed: Jul. 21, 2022

(65) Prior Publication Data

US 2024/0031136 A1    Jan. 25, 2024

(51) Int. Cl.
H04W 48/16    (2009.01)
H04W 76/14    (2018.01)
H04W 76/15    (2018.01)

(52) U.S. Cl.
CPC ........... *H04W 48/16* (2013.01); *H04W 76/14* (2018.02); *H04W 76/15* (2018.02)

(58) Field of Classification Search
CPC ...... H04W 48/16; H04W 76/15; H04W 76/14
USPC ....................................................... 455/41.2
See application file for complete search history.

(56) References Cited

U.S. PATENT DOCUMENTS

| | | | | |
|---|---|---|---|---|
| 10,939,289 B1* | 3/2021 | Krishnakumar | ...... | H04W 76/15 |
| 11,758,598 B1* | 9/2023 | Narula | .................. | H04W 12/50 |
| | | | | 455/41.2 |
| 2014/0281540 A1* | 9/2014 | Brouwer | ................ | H04L 63/065 |
| | | | | 713/169 |
| 2016/0351036 A1* | 12/2016 | Saldin | ................... | G08B 25/008 |
| 2017/0201886 A1* | 7/2017 | Yang | ....................... | H04W 12/06 |
| 2019/0347007 A1* | 11/2019 | Adler | ..................... | G06F 3/0683 |
| 2021/0400492 A1* | 12/2021 | Movva | ................ | H04W 12/069 |
| 2023/0328635 A1* | 10/2023 | Detwiler | ................ | H04W 48/16 |
| | | | | 455/434 |

FOREIGN PATENT DOCUMENTS

| | | | | |
|---|---|---|---|---|
| KR | 20170140372 A | * | 12/2017 | |
| TW | 201409978 A | * | 3/2014 | ........... H04L 67/104 |

* cited by examiner

*Primary Examiner* — Mong-Thuy T Tran
(74) *Attorney, Agent, or Firm* — Fogarty LLP

(57) ABSTRACT

A system and method for generating a coordinated set of peripheral devices that possess the ability to connect and disconnect as a coordinated set to each of multiple Information Handling Systems (IHSs). In an illustrative, non-limiting embodiment, an IHS may include computer-executable instructions to receive an advertisement from a first peripheral device from among a plurality of peripheral devices. Each peripheral device is configured with a common secret group identity key that identifies the peripheral devices as belonging to a coordinated group. When the first peripheral device is recognized as a member of the coordinated group according to the advertisement, perform a discovery operation to identify the first peripheral device and the other peripheral devices using the secret group identity key, and connect the IHS with the first peripheral device and the other peripheral devices that belong to the coordinated set.

18 Claims, 6 Drawing Sheets

SYSTEM AND METHOD FOR BLUETOOTH GROUP PAIRING AND CONNECTIVITY

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

BLUETOOTH has become a de facto standard for wireless connectivity, which is based on a low-cost, short-range radio link. When two BLUETOOTH equipped devices come within range of one another (e.g., 30 feet), they can establish a connection together using the short-range, radio-based link. For example, a BLUETOOTH-enabled IHS can send information to a printer in another room, or it may transfer audio information to a headset that has been previously paired with the IHS. In general, BLUETOOTH devices exchange data between IHSs and peripheral devices over short distances using short-wavelength UHF radio waves in the industrial, scientific, and medical radio bands, from 2.400 to 2.485 GHz, and for building personal area networks (PANs). Examples of BLUETOOTH devices include, but are not limited to mice, keyboards, graphics tablets, image scanners, barcode readers, styluses, cameras, webcams, game pads, memories, monitors, projectors, printers, microphones, headsets, loudspeakers, and the like.

Conventionally, when a user purchases an aftermarket peripheral, such as a Human Interface Device (HID) (e.g., a keyboard or mouse), the factory or manufacturer of the aftermarket peripheral may pre-pair the peripheral to a dongle (e.g., a wireless communications adapter) supplied with the aftermarket peripheral. The dongle is a relatively small device that plugs into a port of the IHS (e.g., a Universal Serial Bus or "USB" port) and allows the peripheral to connect to the IHS via a Radio Frequency (RF) connection or via a wireless protocol, such as BLUETOOTH. Because the peripherals are already paired to the dongle prior to being shipped from the factory, there is no need for the customer to perform additional pairing processes.

SUMMARY

A system and method for generating a coordinated set of peripheral devices that possess the ability to connect and disconnect as a coordinated set to each of multiple Information Handling Systems (IHSs). In an illustrative, non-limiting embodiment, an IHS may include computer-executable instructions to receive an advertisement from a first peripheral device from among a plurality of peripheral devices. Each peripheral device is configured with a common secret group identity key that identifies the peripheral devices as belonging to a coordinated group. When the first peripheral device is recognized as a member of the coordinated group according to the advertisement, perform a discovery operation to identify the first peripheral device and the other peripheral devices using the secret group identity key, and connect the IHS with the first peripheral device and the other peripheral devices that belong to the coordinated set.

According to another embodiment, a wireless group connecting method includes the steps of receiving an advertisement from a first peripheral device from among multiple peripheral devices each configured with a common secret group identity key that identifies the peripheral devices as belonging to a coordinated group. The advertisement includes the secret group identity key. The method further includes the steps of, when the first peripheral device is recognized as a member of the coordinated group according to the advertisement, performing a discovery operation to identify the first peripheral device and the other peripheral devices using the secret group identity key, and connecting an Information Handling System (IHS) with the first peripheral device.

According to yet another embodiment, a memory storage device has program instructions stored thereon that causes an Information Handling System (IHS) to receive an advertisement from a first peripheral device from among a plurality of peripheral devices each configured with a common secret group identity key that identifies the peripheral devices as belonging to a coordinated group such that when the first peripheral device is recognized as a member of the coordinated group according to the advertisement, perform a discovery operation to identify the first peripheral device and the other peripheral devices using the secret group identity key, and connect the IHS with the first peripheral device and the other peripheral devices that belong to the coordinated group. The advertisement includes the secret group identity key;

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
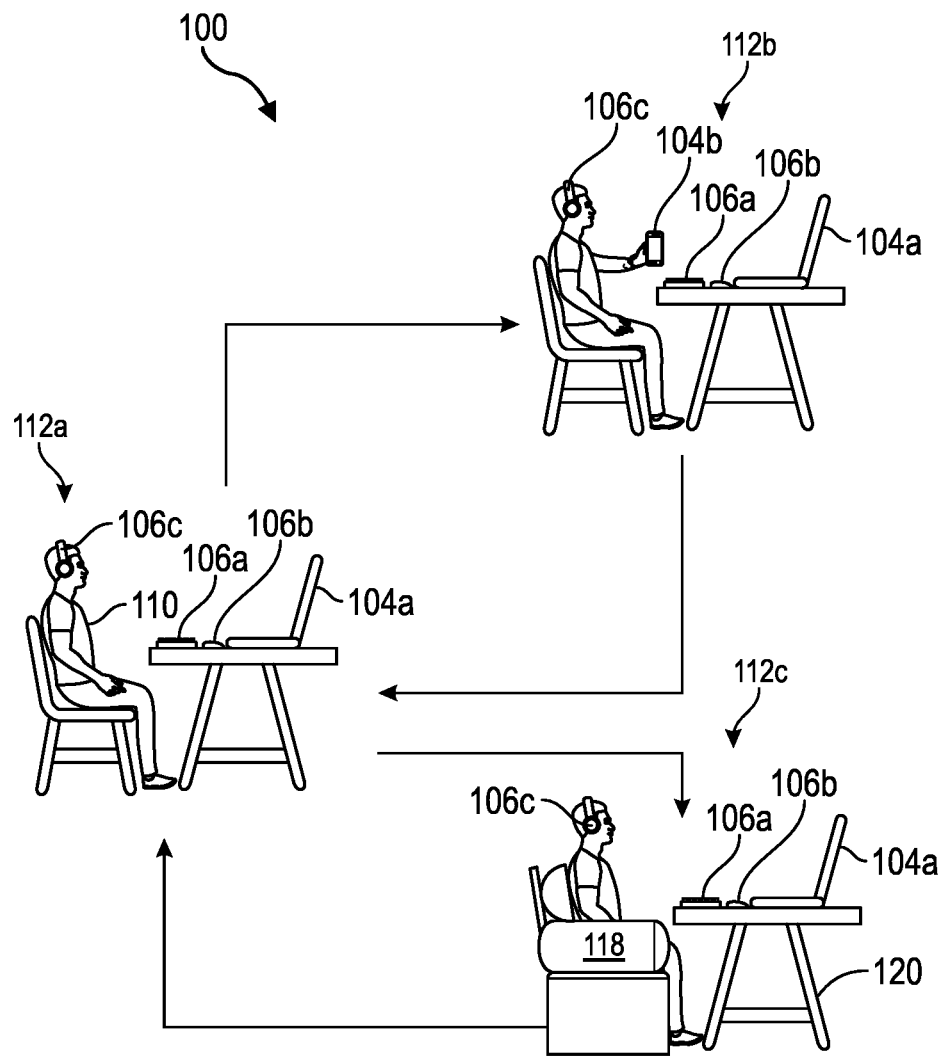
FIG. 1 illustrates an example BLUETOOTH group pairing and connection system that may be used to easily move peripheral devices between multiple client devices according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

BLUETOOTH generally refers to a wireless transmission technology where small, lightweight devices may securely connect to central client device, such as an Information Handling System (IHS). Examples of BLUETOOTH devices include, but are not limited to mice, keyboards, graphics tablets, image scanners, barcode readers, styluses, cameras, webcams, game pads, memories, monitors, projectors, printers, microphones, headsets, loudspeakers, and the like. BLUETOOTH devices are designed to find other BLUETOOTH devices within their range and to discover what services they offer, using a service discovery protocol (SDP). To accomplish this, a BLUETOOTH device sends out an inquiry message searching for other devices in its vicinity. Any other BLUETOOTH device that is listening by means of conducting an inquiry scan, will recognize the inquiry message and respond. The inquiry response is a message packet containing the responding device's BLUETOOTH Device Address (BD_ADDR). The BLUETOOTH device address generally includes a unique, 48-bit IEEE address which is electronically hard-coded into each BLUETOOTH device. The address is virtually guaranteed to be completely unique, so much so that it can be reliably associated with the device's user.

It has been discovered by the inventors in the present case that users may be relatively unlikely to invest in more than one set of peripheral devices, but may have multiple client devices, such as computers, consoles, tablets, and mobiles, which is commonly referred to collectively as Information Handling Systems (IHSs). Conventional BLUETOOTH connection processes often require peripheral devices to be connected to each client device one at a time. This process, however, can be time consuming and cumbersome for users when multiple peripheral devices are initially connected to a first client device and need to be reconnected to a different client device at a later point in time. It is common, for example, for users to have three different peripheral device devices, such as a keyboard, mouse, and headset device to interact with the client device. This problem may be partially solved via the use of dual-mode or tri-mode peripheral devices; however these still require each peripheral device to be paired individually to each client device, particularly when multiple peripheral devices may be used on each client device. This process may also be prone to user error in which users may easily forget which device is paired to a particular client device, which is subsequently re-connected to the incorrect client device.

Another conventional technique has involved network-based solutions, such as the LOGITECH FLOW suite, that typically requires software installation, network configuration, and specialized permissions to send data over a publicly accessible network, such as the Internet. This network-based solution, however, may not be permitted in certain domains, and is often not sufficiently easy for customers to setup, and is, in many cases, not feasible when used with gaming consoles, and other mobile computing platforms.

FIG. 1 illustrates an example BLUETOOTH group pairing and connection system 100 that may be used to easily move peripheral devices between multiple client devices according to one embodiment of the present disclosure. The system 100 generally involves multiple client devices, which in this particular example embodiment, is a computing device IHS 104a, a smartphone IHS 104b, and a tablet IHS 104c (collectively 104) that may be used by a user 110, such as, for example, using three scenarios 112a-c. In particular, a first scenario 112a involves the user 110 interacting with the computing device IHS 104a at work, a second scenario 112b involves the user 110 interacting with a smartphone IHS 104b, while at work, and a third scenario 112c involves the user 110 interacting with a tablet IHS 104c while at home.

To provide a working example, initially the user 110 is interacting with the computing device IHS 104a using various peripheral devices, such as a keyboard peripheral device 106a, a mouse peripheral device 106b, and a headset peripheral device 106c (collectively 106). During work, the user 110 establishes a telecommunication session using the smartphone 104b at scenario 112b by, for example, taking a phone call and/or sending or receiving a sequence of text messages with another person. When the user 110 establishes the telecommunication session, the keyboard peripheral device 106a, mouse peripheral device 106b, and headset peripheral device 106c may be seamlessly switched so that they may now be paired with the smartphone IHS 104b. Thus, the user 110 may conduct the telecommunication session by interacting with the smartphone IHS 104b via the keyboard peripheral device 106a, mouse peripheral device 106b, and headset peripheral device 106c.

When the user 110 is finished conducting the telecommunication session, the first scenario 112a may again be entered by switching the keyboard peripheral device 106a, mouse peripheral device 106b, and headset peripheral device 106c so that they are again seamlessly paired with the computing device IHS 104a. Later in the evening, the user 110 may enter scenario 112c in which the keyboard peripheral device 106a, mouse peripheral device 106b, and headset peripheral device 106c are now seamlessly paired with the user's tablet IHS 104c at home. For example, the user 110 may be sitting on a sofa 118 and interacting with the tablet IHS 104c resting upon a coffee table 120. The next morning, the user 110 may again enter scenario 112a in which the keyboard peripheral device 106a, mouse peripheral device 106b, and headset peripheral device 106c are again seamlessly paired with the computing device 104a at work. Thus as can be seen, the BLUETOOTH group pairing system 100 allows for the user to seamlessly connect with multiple different IHSs 104 using a common set of interface devices (e.g., keyboard peripheral device 106a, mouse peripheral device 106b, and headset peripheral device 106c). Additional details of the BLUETOOTH group pairing system 100 will be described in detail herein below.

Figure 2:
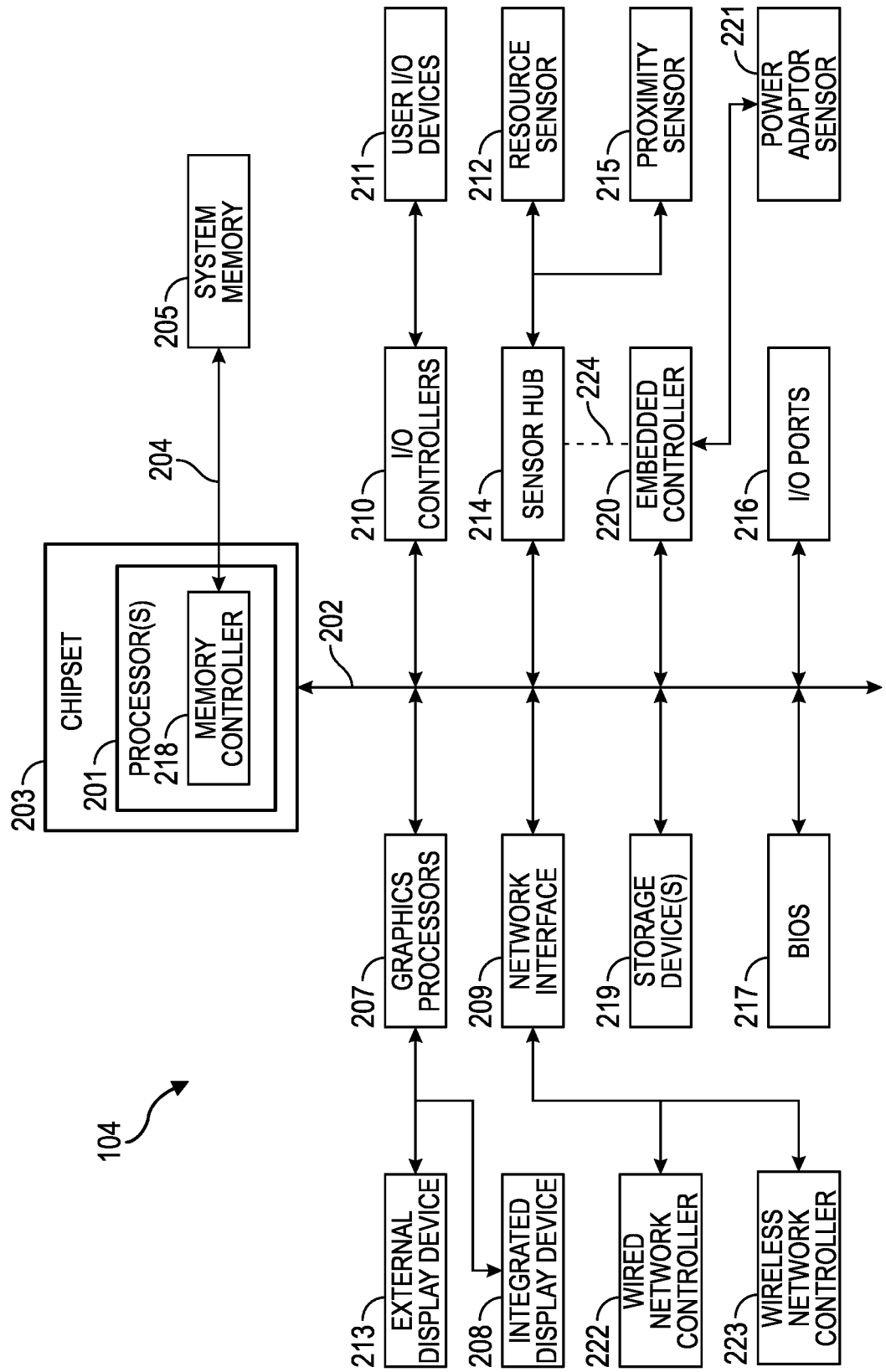
FIG. 2 is a block diagram illustrating components of an example IHS that may be configured to manage the seamless transition of peripheral devices from one IHS to another according to one embodiment of the present disclosure.

FIG. 2 is a block diagram illustrating components of an example IHS 104 that may be configured to manage the seamless transition of peripheral devices from one IHS to another according to one embodiment of the present disclosure. IHS 104 may be incorporated in whole, or part, as one or more of the IHS 104s of FIG. 1. As shown, IHS 104 includes one or more processors 201, such as a Central Processing Unit (CPU), that execute code retrieved from system memory 205. Although IHS 104 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 104 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 104 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 104, bus 202 is illustrated as a single element. Various embodiments may utilize any number of separate buses to provide the illustrated pathways served by bus 202.

In various embodiments, IHS 104 may include one or more I/O ports 216 that may support removable couplings with diverse types of external devices and systems, including removable couplings with peripheral devices that may be configured for operation by a particular user of IHS 104. For instance, I/O 216 ports may include USB (Universal Serial Bus) ports, by which a variety of external devices may be coupled to IHS 104. In addition to or instead of USB ports, I/O ports 216 may include diverse types of physical I/O ports that are accessible to a user via the enclosure of the IHS 104.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 104 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 104. User I/O devices 211 may interface with an I/O controller 210 through wired or wireless couplings supported by IHS 104. In some cases, I/O controllers 210 may support configurable operation of supported peripheral devices, such as user I/O devices 211.

As illustrated, a variety of additional resources may be coupled to the processor(s) 201 of the IHS 104 through the chipset 203. For instance, chipset 203 may be coupled to network interface 209 that may support diverse types of network connectivity. IHS 104 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support diverse types of network connectivity, such as the network connectivity utilized by IHS 104.

Chipset 203 may also provide access to one or more display device(s) 208 and 213 via graphics processor 207. Graphics processor 207 may be included within a video card, graphics card or within an embedded controller installed within IHS 104. Additionally, or alternatively, graphics processor 207 may be integrated within processor 201, such as a component of a system-on-chip (SoC). Graphics processor 207 may generate Display information and provide the generated information to one or more Display device(s) 208 and 213, coupled to IHS 104.

One or more Display devices 208 and 213 coupled to IHS 104 may utilize LCD, LED, OLED, or other Display technologies. Each Display device 208 and 213 may be capable of receiving touch inputs such as via a touch controller that may be an embedded component of the Display device 208 and 213 or graphics processor 207, or it may be a separate component of IHS 104 accessed via bus 202. In some cases, power to graphics processor 207, integrated Display device 208 and/or external Display device 213 may be turned off, or configured to operate at minimal power levels, in response to IHS 104 entering a low-power state (e.g., standby).

As illustrated, IHS 104 may support an integrated Display device 208, such as a Display integrated into a laptop, tablet, 2-in-1 convertible device, or mobile device. IHS 104 may also support use of one or more external Display devices 213, such as external monitors that may be coupled to IHS 104 via distinct types of couplings, such as by connecting a cable from the external Display devices 213 to external I/O port 216 of the IHS 104. In certain scenarios, the operation of integrated displays 208 and external displays 213 may be configured for a particular user. For instance, a particular user may prefer specific brightness settings that may vary the Display brightness based on time of day and ambient lighting conditions.

Chipset 203 also provides processor 201 with access to one or more storage devices 219. In various embodiments, storage device 219 may be integral to IHS 104 or may be external to IHS 104. In certain embodiments, storage device 219 may be accessed via a storage controller that may be an integrated component of the storage device. Storage device 219 may be implemented using any memory technology allowing IHS 104 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 104 also includes Basic Input/Output System (BIOS) 217 that may be stored in a non-volatile memory accessible by chipset 203 via bus 202. Upon powering or restarting IHS 104, processor(s) 201 may utilize BIOS 217 instructions to initialize and test hardware components coupled to the IHS 104. BIOS 217 instructions may also load an operating system (OS) (e.g., WINDOWS, MACOS, iOS, ANDROID, LINUX, etc.) for use by IHS 104.

BIOS 217 provides an abstraction layer that allows the operating system to interface with the hardware components of the IHS 104. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 104 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 104 (e.g., CPU 201, GPU 207, system memory 205, etc.). In certain embodiments, sensor hub 214 may also include capabilities for determining a location and movement of IHS 104 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 104, absence from IHS 104, and/or distance from IHS 104 (e.g., near-field, mid-field, or far-field).

In certain embodiments, sensor hub 214 may be an independent microcontroller or other logic unit that is coupled to the motherboard of IHS 104. Sensor hub 214 may be a component of an integrated system-on-chip incorporated into processor 201, and it may communicate with chipset 203 via a bus connection such as an Inter-Integrated Circuit (I²C) bus or other suitable type of bus connection. Sensor hub 214 may also utilize an I²C bus for communicating with various sensors supported by IHS 104.

As illustrated, IHS 104 may utilize embedded controller (EC) 220, which may be a motherboard component of IHS 104 and may include one or more logic units. In certain embodiments, EC 220 may operate from a separate power plane from the main processors 201 and thus the OS operations of IHS 104. Firmware instructions utilized by EC 220 may be used to operate a secure execution system that may include operations for providing various core functions of IHS 104, such as power management, management of operating modes in which IHS 104 may be physically configured and support for certain integrated I/O functions.

EC 220 may also implement operations for interfacing with power adapter sensor 221 in managing power for IHS 104. These operations may be utilized to determine the power status of IHS 104, such as whether IHS 104 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 104 may not include each of the components shown in FIG. 2. Additionally, or alternatively, IHS 104 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

The group pairing and connection system 100 provides a technique to generate a coordinated set of peripheral devices 106 that possess the ability to connect and disconnect as a coordinated set to each of multiple IHSs 104. All the peripheral devices 106 identified to belong to a coordinated group will be programmed with a common secret group identity key so they can all identify themselves similarly but independently connect and operate according to their supported features that are managed according to applicable Bluetooth profiles. Additional information (e.g., metadata) can be added to a secret group identity key matching the size of the group to confirm that the peripheral device 106 is part of the coordinated set. The peripheral devices can be provisioned to be part of multiple groups when bonded with different IHSs, but they can connect only with the first available IHS 104 as a group. Additionally, the number of groups can be limited. The connection is managed by the IHS 104. If one device from the group is connected at a given time with an IHS, all the members would connect with the same IHS.

According to one embodiment, switching the peripheral devices 106 between each of the IHSs 104 may be performed according to their relative proximity to an IHS 104. For example, if the user 110 is carrying the peripheral devices 106, such as in a briefcase when entering the office, the peripheral devices 106 will automatically pair with the user's office IHS 104a as a coordinated set. When the user 110 leaves the office with a smartphone IHS 104b, the peripheral devices 106 may detect the loss of connection with the office IHS 104a and automatically pair with the smartphone 104b that the user 110 is currently carrying.

Figure 3:
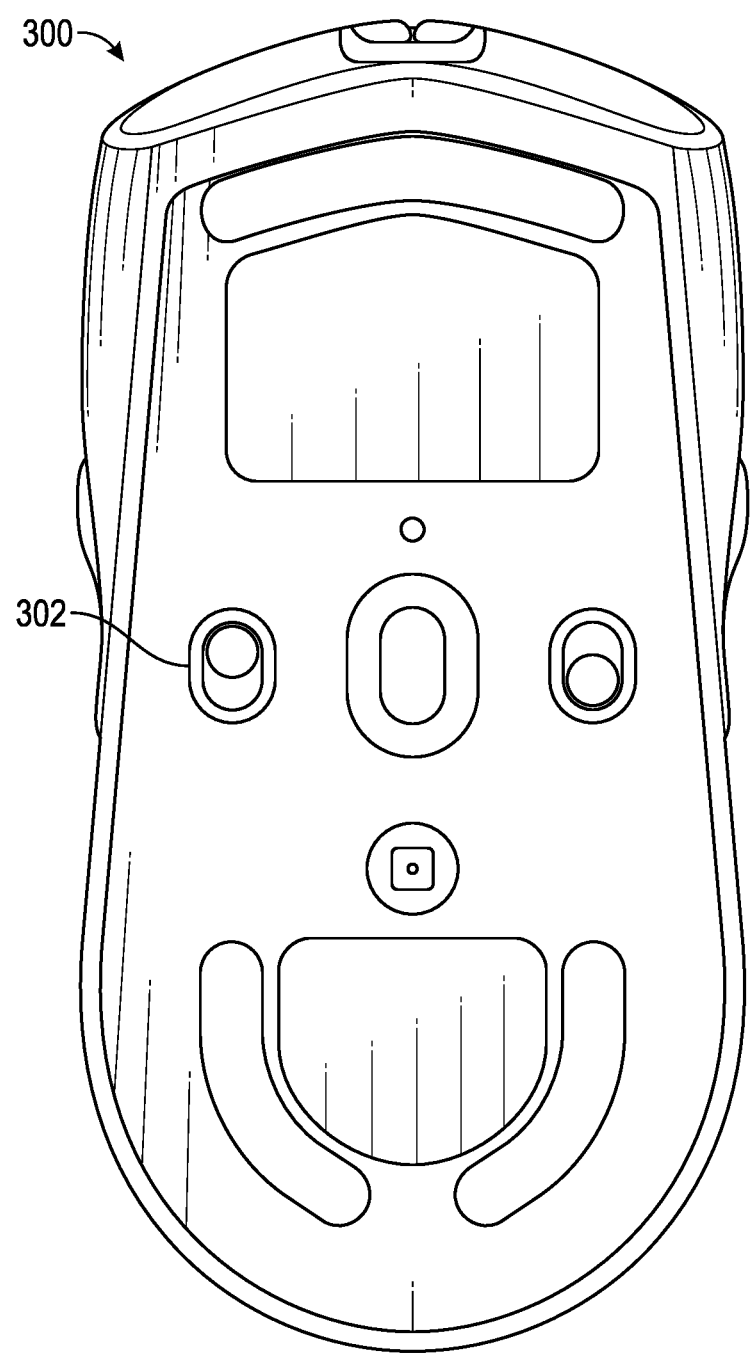
FIG. 3 illustrates an underside view of the mouse peripheral device according to one embodiment of the present disclosure.

According to another embodiment, switching the peripheral devices 106 between each of the IHSs 104 may be performed manually by the user 110. For example, FIG. 3 illustrates an underside view of the mouse peripheral device 106b according to one embodiment of the present disclosure. As shown, the mouse peripheral device 106b includes, among other things, and an IHS selector switch 302. When the user 110 is in relatively close proximity to two or more IHSs 104, the user 110 may manually select, using the IHS selector switch 302, which IHS 104 that the peripheral devices 106 will connect with. Although the IHS selector switch 302 is shown having three selectable positions for manually selecting from among three different IHSs 104, it should be appreciated that in other embodiments, the IHS selector switch 304 may have any suitable number of switch positions, such as two selectable positions, or four or more selectable positions. Additionally, other peripheral devices 106 may include selector switches or other user interface mechanisms for switching between IHSs 104. For example, the keyboard peripheral device 106a may be configured with certain hot keys that when selected cause the peripheral devices 106 to connect a certain desired IHS 104.

Each peripheral device 106 may be configured with logic to generate a coordinated set of peripheral devices 106 that possess the ability to connect and disconnect as a coordinated set to each of multiple IHSs 104. For example, each peripheral device 106 may be configured with an executable peripheral device-based service to advertise the peripheral device 106 as a device that can be grouped into a coordinated set. This peripheral device-based service can be provided by generating a new Universally Unique Identifier (UUID), which can be registered with the Bluetooth Special Interest Group (SIG) standards organization as a peripheral device-based service to be used for peripheral device coordination.

The peripheral device-based service includes a secret group identity key, which is provisioned into the peripheral device 106 at the factory and added to the advertisement packets to identify that the peripheral device 106 is enabled to support peripheral device grouping. In one embodiment, multiple peripheral devices 106 may be provisioned with the same secret group identity key and packaged for sale as a single unit. For enhanced security, the secret group identity key can be used to generate a Resolvable Set Identifier (RSI) that would be advertised as generic information for each group of peripheral devices 106. Thus, the secret group identity key may be transmitted in encrypted form, and the RSI used to resolve it at the receiving end.

According to embodiments of the present disclosure, each IHS 104 may be configured with logic (e.g., executable software) to manage and control device coordination. The IHS-based service may be configured to discover peripheral devices 106 capable of being configured as a coordinated set by receiving advertisements provisioned with the secret group identity key as part of the bonding process. The IHS-based service can be configured for discovery of multiple devices. In one embodiment, the IHS-based service may be provided as part of a DELL QUICK PAIR utility that can be enhanced to show multiple peripheral devices 106 and allow additional time for device discovery when configured to support coordinated groups. The IHS-based service can be configured to only add one peripheral device of the same class of device (e.g. a mouse) or multiple devices of the same class of peripheral device (e.g. multiple audio peripheral devices) to the coordinated group. The IHS-based service may also include logic to allow the user 110 to select peripheral devices to be added to the coordinated group as part of the bonding process.

In one embodiment, the IHS-based service can be used to resolve a pre-paired set of peripheral devices using a common secret group identity key configured with 'n' number of peripheral devices in the group. For example, the IHS-based service may display a message to power on all the peripheral devices in the group so pairing of the coordinated group can be completed. The pairing of the group may not be completed till all the peripheral devices are available at the same time. In absence of the group, individual peripheral devices can pair and operate as individual peripheral devices.

Figure 4:
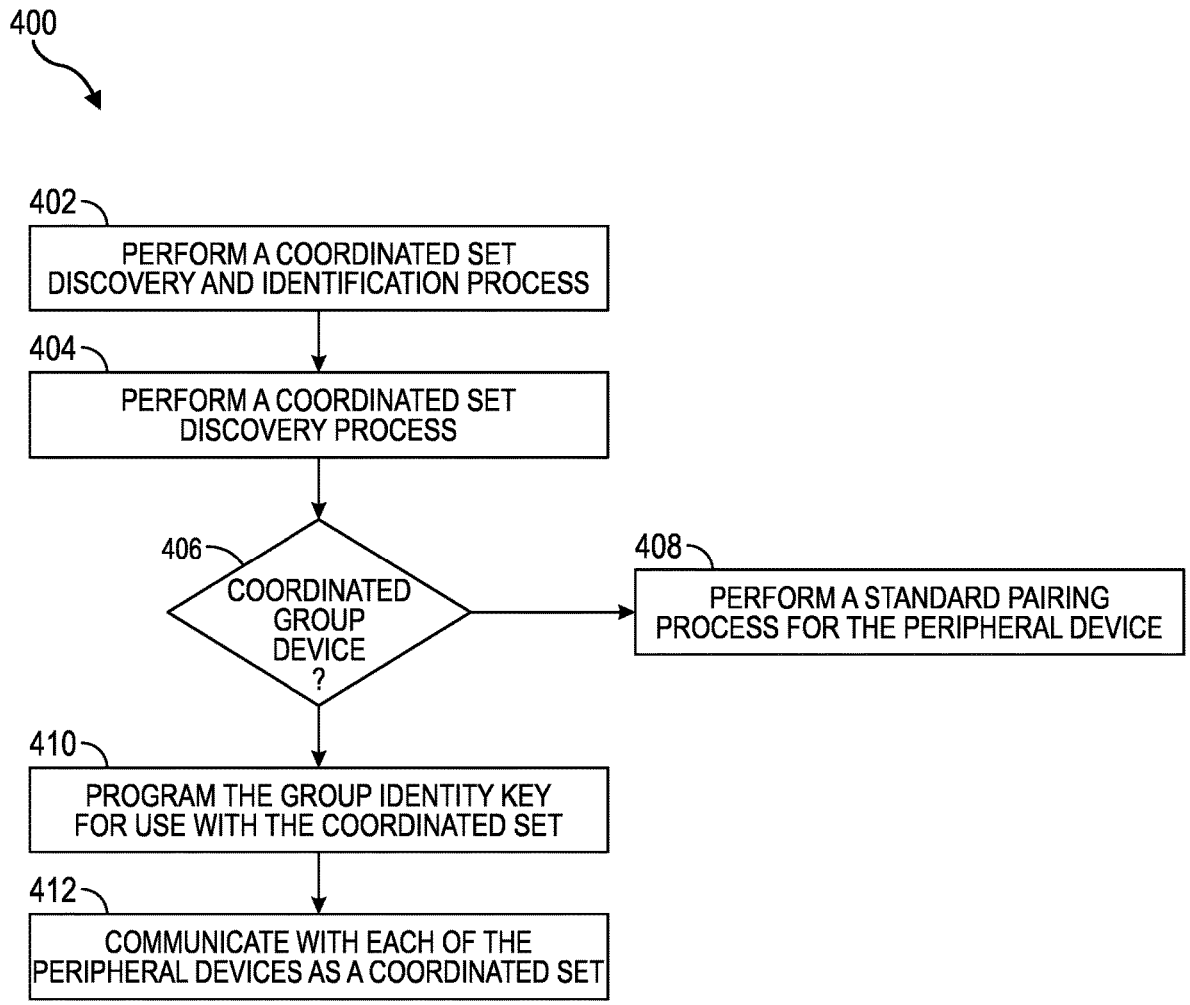
FIG. 4 illustrates an example group device set discovery and control method according to one embodiment of the present disclosure.

FIG. 4 illustrates an example group device set discovery and control method 400 according to one embodiment of the present disclosure. The method 400 may be executed by logic (a wireless transceiver module, a microcontroller, an application specific integrated circuit (ASIC), or the like) operatively housed in the IHS 104 and/or peripheral device 106, such as the peripheral device-based service and/or IHS-base service described above. In one embodiment, the method 400 may be performed as an initial measure to pair the peripheral devices 106 with the IHS 104 and to function as a coordinated set.

At step 402, the method 400 performs a coordinated set discovery and identification process. The coordinated set discovery and identification process may discover the identity of the coordinated set by obtaining the value of a secret group identity key stored in each of the peripheral devices 106. In one embodiment, the secret group identity key is programmed into the peripheral devices 106 during manufacture or when the peripheral devices 106 are packaged for sale to the user 110. For example, the keyboard peripheral device 106a, mouse peripheral device 106b, and headset device 106c may each be programmed with a common secret group identity key and packaged as a set for the user 110. In an alternative embodiment, the coordinated set discovery and identification process, or other suitable process, may program the secret group identity key in each of the peripheral devices 106 when they are initially paired with the IHS 104 to form a coordinated set of peripheral devices 106.

At step 404, the method 400 performs a coordinated set discovery process. That is, the method 400 may perform a limited discovery process to obtain PSRI information, such as peripheral device capabilities, settings, device configuration, and the like, for each of the peripheral devices 106 identified using the secret group identity key. In a particular embodiment, the method 400 may perform a BLUETOOTH generic attribute profile attribute (GATT) sub-procedure to discover the characteristics of each peripheral device 106.

The method 400 then at step 406 determines, for each peripheral device 106, whether it is a member of the coordinated group. If not, the method 400 then performs a standard pairing process for that peripheral device 106 at step 408. If, however, the device 106 is a member of the coordinated group, the method 400 performs a pairing operation, and programs the secret group identity key for use with the coordinated set at step 410. Thereafter at step 412, the method 400 communicates with each of the peripheral devices 106 as a coordinated set. For example, the IHS 104 may use individual device connection control using BLUETOOTH standard procedures defined in the peripheral device profile, such as a headphone profile (e.g., Advanced Audio Distribution profile (A2DP), or BLUETOOTH low-energy (LE) Audio profile) for that device.

Figure 5:
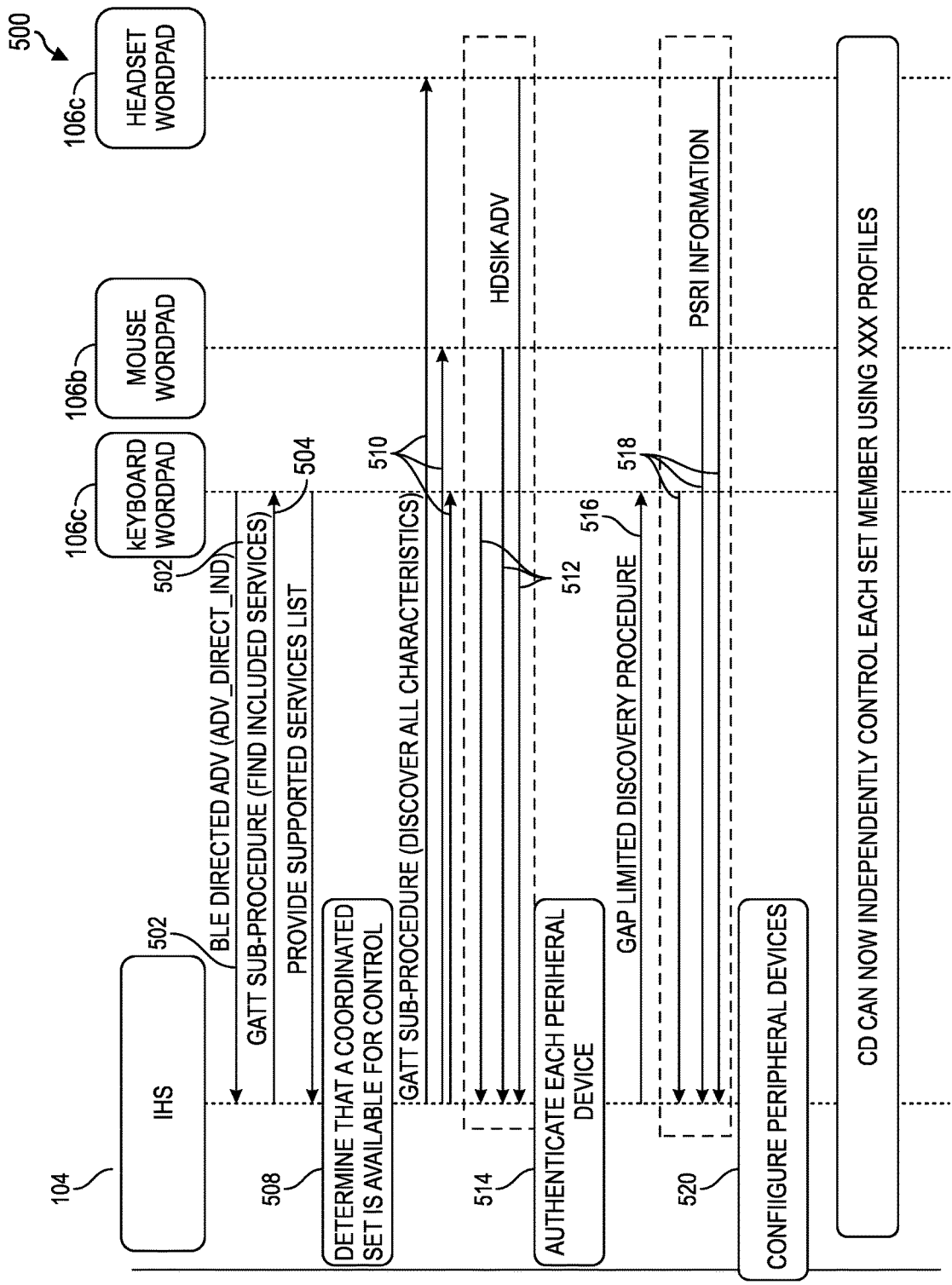
FIG. 5 is a flow diagram illustrating how multiple peripheral devices of a coordinated set may connect to an IHS according to one embodiment of the present disclosure.

FIG. 5 is a flow diagram 500 illustrating how multiple peripheral devices 106 of a coordinated set may connect to an IHS (e.g., client device) according to one embodiment of the present disclosure. Although the peripheral devices are described herein as being a keyboard peripheral device 106a, mouse peripheral device 106b, and a headset peripheral device 106c, it should be understood that any suitable type of peripheral device 106 may be used, which can be programmed to be part of a coordinated set. Initially, all of the peripheral devices 106 are in a disconnected state relative to the IHS 104.

At step 502, the keyboard peripheral device 106a transmits a BLE directed advertisement (e.g., ADV_DIRECT_IND), which is received by the IHS 104. While the present embodiment describes the keyboard peripheral device 106a as transmitting the initial advertisement to the IHS 104, it should be understood that the IHS 104 can receive and process the advertisement from any peripheral device 106 in the coordinated set. The IHS 104 responds to the advertisement at step 504 by issuing a GATT sub-procedure (e.g., find included services sub-procedure) to the keyboard peripheral device 106a, which in the present case, is the initiating peripheral device. Thereafter at step 506, the keyboard peripheral device 106a responds by sending a supported services list to the IHS 104. The supported services list may include, for example, an identity of itself (keyboard peripheral device 106a), and an identity of the other peripheral devices in the coordinated set. In some embodiments, the supported services list may include information about a quantity of peripheral devices in the coordinated set. Such information may be useful for, among other things, determining whether all peripheral devices in the coordinated set are connected, or are available for being connected to the IHS 104. The supported services list may be generated, for example, at step 410 of FIG. 4 as described herein above.

The IHS 104 at step 508 processes the received supported services set to determine that the peripheral device 106*a* is a member of a coordinated set. As such, the IHS 104 performs a GATT sub-procedure to discover the characteristics of each of the peripheral devices 106 at step 510. GATT Sub-Procedures can be specific to each peripheral device 106 so the control services will be rendered for each supported device. Thus, each peripheral device 106 responds at step 512 by sending its copy of the secret group identity key for authentication with the IHS 104. In an alternative embodiment, a generic procedure may be used to provide support for those devices that support a Coordinated Setup Identity Protocol (CSIP). Then at step 514, the IHS 104 authenticates each peripheral device 106 to form individual connections.

Having formed a connection, the IHS 104 at step 516 performs a General Access Profile (GAP) discovery procedure to obtain PSRI information (e.g., peripheral device capabilities, device settings, user profiles, etc.) from each of the peripheral devices 106. Thereafter at step 518, each peripheral device 106 responds by sending its PSRI information to the IHS 104. The IHS 104 then configures each peripheral device 106 for being controlled at step 520. At this point, the IHS 104 has established a connection with all of the peripheral devices 106, and thus may use the peripheral devices 106 to interact with the user 110. The aforedescribed group connection process may be performed each time a coordinated set of peripheral devices 106 connect with an IHS 104 as a group. Nevertheless, when use of the group connection process is no longer needed or desired, the process ends.

Although FIG. 5 describes an example group connection process that may be performed to connect a coordinated set of devices to an IHS, the features of the process may be embodied in other specific forms without deviating from the spirit and scope of the present disclosure. For example, the process may perform additional, fewer, or different operations than those described in the present examples. For another example, the process may be performed in a sequence of steps different from that described above.

Figure 6:
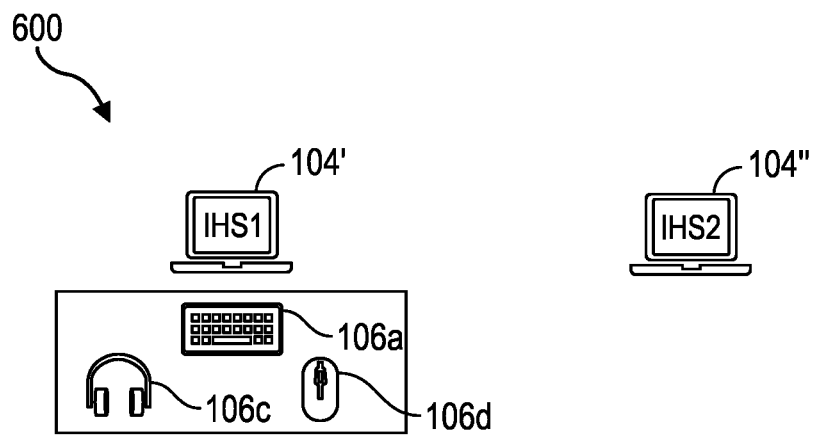
FIGS. 6-8 illustrate several peripheral device connection scenarios that may be performed by the group pairing and connection system according to one embodiment of the present disclosure.
Figure 7:
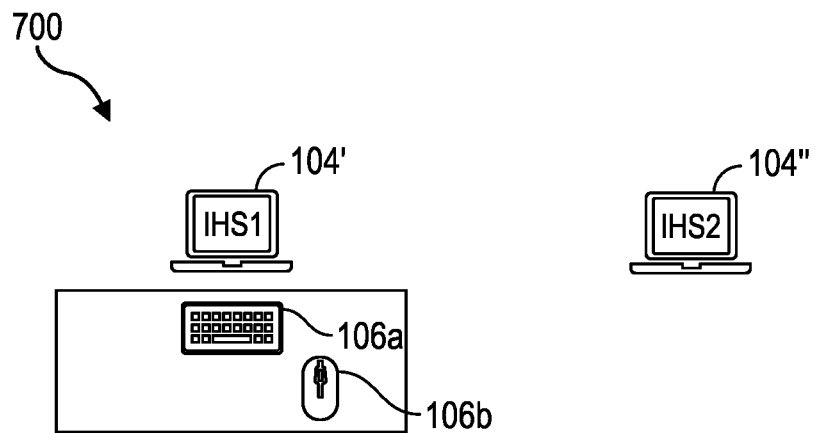
Figure 8:
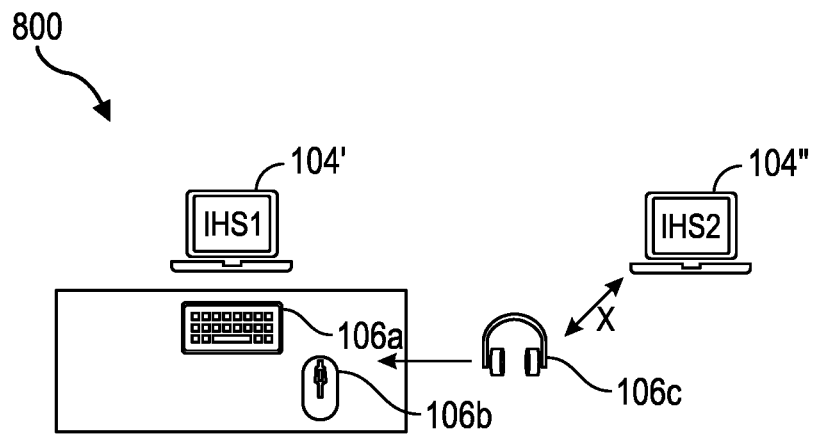

FIGS. 6-8 illustrate several peripheral device connection scenarios that may be performed by the group pairing and connection system 100 according to one embodiment of the present disclosure. In particular, FIG. 6 illustrates how the system 100 may connect multiple peripheral devices 106 as a group, FIG. 7 illustrates how the system 100 may form connections when one or more members of coordinated set are not available, and FIG. 8 illustrates how the system 100 may form a connection with the one or more previously unavailable members that has recently become available.

Referring initially to FIG. 6, the connection scenario 600 shows how the system 100 may form connections with multiple peripheral devices 106 with a first IHS 104' to the exclusion of a second IHS 104" that may also be in close proximity to the devices 106. A keyboard peripheral device 106*a*, mouse peripheral device 106*b*, and a headset peripheral device 106*c* is in close proximity to, and have all been previously paired with IHS 104' and IHS 104". In this scenario, each IHS 104', 104" will start a BLUETOOTH device discovery service at start-up or when they exit a low power (e.g., hibernate, suspend, etc.) state. As part of the discovery service, all peripheral devices 106 in the coordinated set would advertise its secret group identity key as part of the advertisement (e.g., BLE advertisement). The IHS 104', 104" which detects the first peripheral device 106 would connect with it and start directed discovery of the remaining peripheral devices 106 of the coordinated set to connect with them.

Referring now to FIG. 7, the scenario 700 shows how the system 100 may form connections when one or more peripheral devices 106 of the coordinated set are not available. In this scenario 700, the keyboard peripheral device 106*a* and mouse peripheral device 106*b* are in close proximity to, and have all been previously paired with IHS 104' and IHS 104". One of the peripheral devices of the coordinated set, namely headset peripheral device 106*c* is either powered off or is out of range. In this scenario 700, each IHS 104', 104" will start the BLUETOOTH device discovery service at start-up or when they each exist a low power state. All peripheral devices (i.e., keyboard peripheral device 106*a* and mouse peripheral device 106*b*) may advertise its secret group identity key as part of its advertisement (e.g., BLE advertisement). The IHS 104', 104" which detects the first peripheral device 106 would connect with it and start directed discovery of the remaining peripheral devices 106, which in this particular scenario is the mouse peripheral device 106. of the coordinated set to connect with them. Once all the peripheral devices 106 are connected, discovery of other peripheral devices 106 devices can time-out or follow a slow duty cycle discovery procedure. Once all the available peripheral devices (e.g., keyboard peripheral device 106*a* and mouse peripheral device 106*b*) are connected, the IHS 104' can follow a slow duty cycle discovery process for the missing peripheral device (e.g., headset peripheral device 106*c*).

Referring now to FIG. 8, the scenario 800 shows how the system 100 may form a connection with the one or more previously unavailable peripheral devices 106*c* that become available at a later point in time. For example, scenario 800 may be encountered when the headset peripheral device 106*c*, which was unavailable in scenario 700 when connections were formed with the keyboard peripheral device 106*a* and mouse peripheral device 106*b*, has now become available. In this case, the IHS 104' recognizes that connections with all peripheral devices 106 in the coordinated set have not yet been established, and therefore, the IHS 104' continues with a slow duty cycle discovery process for the missing device. When the headset peripheral device 106*c* becomes available, the IHS 104' may still discover and connect with it. It is possible that the IHS 104" may find the missing member (e.g., headset peripheral device 106*c*) and try to connect with it. Once connected, the IHS 104" may then attempt to connect with the other peripheral devices 106 of the coordinated set. The members, however, will reject the connection request indicating that they are already connected with the IHS 104'. At this point, the IHS 104" will drop the connection with the headset peripheral device 106*c* and allow the IHS 104' to discover and connect with it.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) orchestration system, comprising:
    at least one processor; and
    at least one memory coupled to the at least one processor, the at least one memory having program instructions stored thereon that, upon execution by the at least one processor, cause the IHS to:
        receive an advertisement from a first peripheral device from among a plurality of peripheral devices each configured with a common secret group identity key that identifies the peripheral devices as belonging to a coordinated group, wherein the advertisement includes the secret group identity key;
        when the first peripheral device is recognized as a member of the coordinated group according to the advertisement, perform a discovery operation to identify the first peripheral device and the other peripheral devices using the secret group identity key; and
        receive user input for selecting a first of among a plurality of IHSs that the peripheral devices are to be connected to and in response, connect the first IHS with the first peripheral device and the other peripheral devices that belong to the coordinated group; and
        at a later point in time, receive user input for selecting a second of among the plurality of IHSs that the peripheral devices are to be connected to and in response, connect the second IHS with the first peripheral device and the other peripheral devices that belong to the coordinated group.

2. The IHS of claim 1, wherein the program instructions, upon execution, further cause the IHS to, when a missing peripheral device is not available, perform a slow duty cycle discovery process for the missing peripheral device.

3. The IHS of claim 2, wherein the program instructions, upon execution, further cause the IHS to, when the missing peripheral device becomes available and another IHS connects with the missing peripheral device, the other peripheral devices reject a connection request from the other IHS, the other IHS drops the connection to the missing peripheral device to allow the instructions to connect with the missing peripheral device.

4. The IHS of claim 1, wherein the program instructions, upon execution, further cause the IHS to receive the user input from a user interface device configured on the first peripheral device.

5. The IHS of claim 1, wherein the program instructions, upon execution, further cause the IHS to when the first peripheral device becomes in range of the IHS, trigger a connection request to each of the peripheral devices.

6. The IHS of claim 1, wherein the first peripheral device is a member of a plurality of the coordinated groups.

7. The IHS of claim 1, wherein the advertisement includes information associated with a quantity of peripheral devices belonging to the coordinated group.

8. The IHS of claim 1, wherein the program instructions, upon execution, further cause the IHS to:
    when the other peripheral devices are not available, individually connect with the first peripheral device.

9. The IHS of claim 1, wherein the program instructions, upon execution, further cause the IHS to provide the peripheral devices as a packaged set to a user, each of the peripheral devices being programmed with the secret group identity key.

10. A wireless group connecting method comprising:
    receiving an advertisement from a first peripheral device from among a plurality of peripheral devices each configured with a common secret group identity key that identifies the peripheral devices as belonging to a coordinated group, wherein the advertisement includes the secret group identity key;
    when the first peripheral device is recognized as a member of the coordinated group according to the advertisement, performing a discovery operation to identify the first peripheral device and the other peripheral devices using the secret group identity key; and
    receiving user input for selecting a first of among a plurality of IHSs that the peripheral devices are to be connected to and in response, connecting the first IHS with the first peripheral device and the other peripheral devices that belong to the coordinated group; and
    at a later point in time, receiving user input for selecting a second of among the plurality of IHSs that the peripheral devices are to be connected to and in response, connect the second IHS with the first peripheral device and the other peripheral devices that belong to the coordinated group.

11. The wireless group connecting method of claim 10, further comprising, when a missing peripheral device is not available, performing a slow duty cycle discovery process for the missing peripheral device.

12. The wireless group connecting method of claim 10, further comprising receiving the user input from a user interface device configured on the first peripheral device.

13. The wireless group connecting method of claim 10, further comprising, when the first peripheral device becomes in range of the IHS, triggering a connection request to each of the peripheral devices.

14. The wireless group connecting method of claim 10, further comprising wherein the program instructions, upon execution, further cause the IHS to, when the other peripheral devices are not available, individually connect with the first peripheral device.

15. A memory storage device having program instructions stored thereon that, upon execution by one or more processors of an Information Handling System (IHS), cause the IHS to:
   receive an advertisement from a first peripheral device from among a plurality of peripheral devices each configured with a common secret group identity key that identifies the peripheral devices as belonging to a coordinated group, wherein the advertisement includes the secret group identity key;
   when the first peripheral device is recognized as a member of the coordinated group according to the advertisement, perform a discovery operation to identify the first peripheral device and the other peripheral devices using the secret group identity key;
   receive user input for selecting a first of among a plurality of IHSs that the peripheral devices are to be connected to and in response, connect the first IHS with the first peripheral device and the other peripheral devices that belong to the coordinated group; and
   at a later point in time, receive user input for selecting a second of among the plurality of IHSs that the peripheral devices are to be connected to and in response, connect the second IHS with the first peripheral device and the other peripheral devices that belong to the coordinated group.

16. The memory storage device of claim 15, wherein the program instructions, upon execution, further cause the IHS to:
   when a missing peripheral device is not available, perform a slow duty cycle discovery process for the missing peripheral device; and
   when the missing peripheral device becomes available and another IHS connects with the missing peripheral device, the other peripheral devices reject a connection request from the other IHS, the other IHS drops the connection to the missing peripheral device to allow the instructions to connect with the missing peripheral device.

17. The memory storage device of claim 16, wherein the first peripheral device is a member of a plurality of the coordinated groups.

18. The memory storage device of claim 16, wherein the program instructions, upon execution, further cause the IHS to when the other peripheral devices are not available, individually connect with the first peripheral device.

* * * * *